June 8, 1965 H. KUSTER 3,188,015
JOINING APPARATUS
Filed Nov. 21, 1962 3 Sheets-Sheet 1

INVENTOR.
HEINZ KUSTER
BY
Ward, Neal, Haselton, Orme & McElhannon
ATTORNEYS

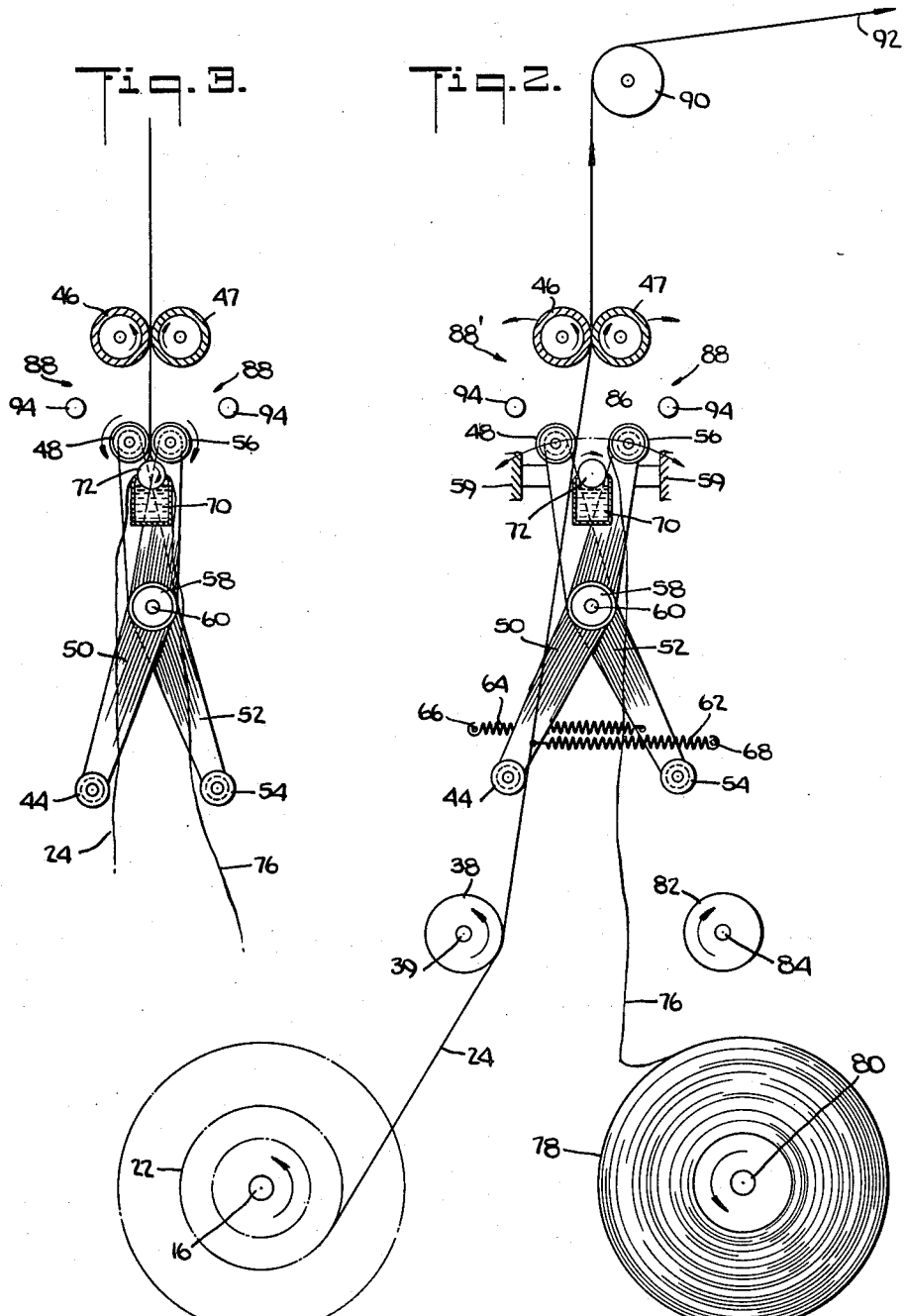

June 8, 1965

H. KUSTER 3,188,015

JOINING APPARATUS

Filed Nov. 21, 1962

INVENTOR.
HEINZ KUSTER

BY

Ward, Neal, Haselton, Orme & McElhannon
ATTORNEYS

United States Patent Office

3,188,015
Patented June 8, 1965

3,188,015
JOINING APPARATUS
Heinz Kuster, Kristianstad, Sweden, assignor to Heberlein Patent Corporation, New York, N.Y., a corporation of New York
Filed Nov. 21, 1962, Ser. No. 239,273
Claims priority, application Switzerland, Nov. 30, 1961, 13,937/61
14 Claims. (Cl. 242—58.3)

This invention relates to the joining of two webs of material one to the other and more particularly to splicing a moving web.

In the treatment of webs of sheet material, for example in the printing or embossing of synthetic foils or films such as polyethylene or cellophane for example, or paper webs, removal of the treated web and the insertion of a new web normally causes undesirable loss of time and additional labor. One of the objects of the present invention is to allow the web which is to be treated to run continuously through the working machine by automatically joining the adjacent ends of the nearly exhausted web to the beginning of a new web held in reserve for the purpose.

Early web splicing devices were hindered by the fact that the speed of joining adjacent webs was seriously limited and frequently the apparatus had to be completely shut-down during the change-over period. In recently developed machines for processing webs of material there has been a tendency to increase the rate of speed or the travel of the web therethrough and thereby very significantly increase the rate of production. This requires a web splicing device that will efficiently and rapidly join the terminal portions of the webs so that the web processing apparatus may be maintained in continuous high-speed operation.

In accordance with the present invention in its broader aspects, the end terminal portion of a nearly exhausted web and the starting terminal portion of a newly supplied web are overlapped in superposed face-to-face relation. At least one face portion is provided with adhesive for adhering to the other and the two faces are then pressed together. The pressing together of the two faces is automatically initiated in response to the release of the longitudinal tension of the nearly exhausted web of material.

The web splicing device of a presently preferred embodiment of the present invention comprises two pairs of scissor levers, a pair of rear web guiding means and a pair of forward web guiding means mounted on the corresponding ends of the levers, respectively. These guiding means are preferably axially parallel rollers which are journaled adjacent the ends of the scissors. The first web is adapted to run under tension from a first mill or supply roll and the second web is adapted to run under tension from a second stand-by roll upon exhaustion of the first roll. The first web is so directed over the forward and rear guiding means or rollers that the tension of the web acts against said rollers urging the scissors open. Likewise the second web is so positioned as to similarly engage the other forward and rear rollers for opening the scissors following joining and when the second web is running under tension. Means are provided for holding the feed end of the second web in a position for engagement with the first web upon its exhaustion while the first web is running under tension. Means are preferably provided for applying adhesive to the terminal portion of one of the webs. The two forward guides or rollers coact to press the respective terminal portions of said webs one against the other when the tension in the first web is released and the scissors are closed. In lieu of means for applying an adhesive material e.g. a paste or an adhesive tape or strip, the web may have applied thereto adjacent its end an adhesive material tape prior to winding onto the supply roll.

Further objects, features and advantages of the invention hereof will appear from the following detailed description given below taken in connection with the accompanying drawings which form a part of this specification and illustrate by way of example, preferred embodiments of the invention.

In the drawings:

FIG. 2 is a side elevational view showing the splicing apparatus when the scissor-like pair of levers are open;

FIG. 3 is the same view as shown in FIG. 2 except that the scissor-like levers are shown in the closed position;

Figure 1:
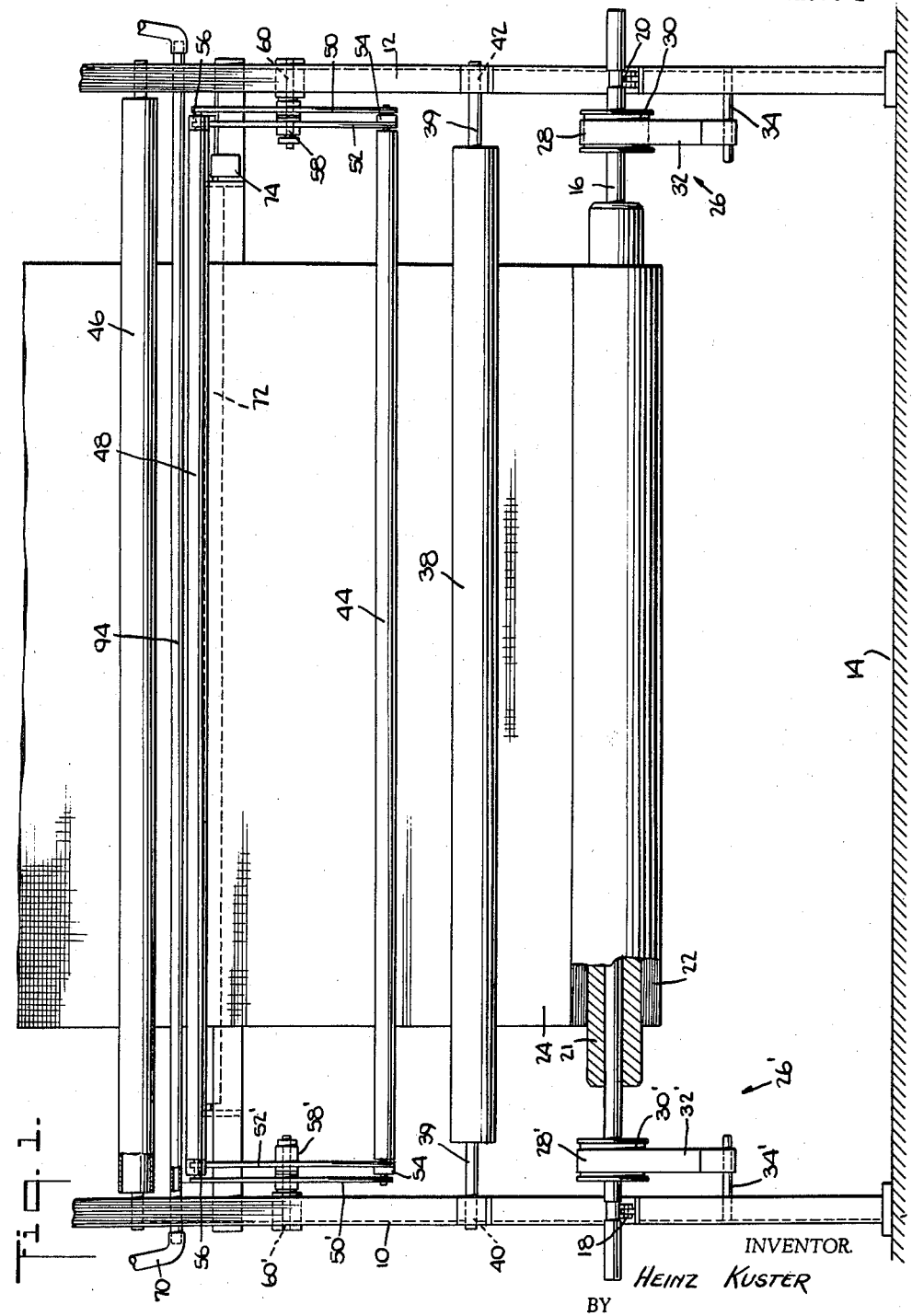
FIG. 1 is a side elevational view partially broken away to show a web splicing device constructed in accordance with this invention.

Referring now to the drawings in greater detail and more particularly to FIGS. 1 and 2, there is illustrated a web splicing device constructed in accordance with the concepts of my invention. A pair of supporting members 10 and 12 are fixedly secured to a base member 14, and a shaft 16 is rotatably mounted in suitable journals 18 and 20 provided in support members 10 and 12, respectively, for the purpose. Alternatively, anti-friction bearings may be employed, if desired. A sleeve-like core 21 is mounted about and removably secured to the shaft 16 as shown in FIG. 1. The core 21 is adapted for the winding thereon of a mill or supply roll 22 of sheet material, from which the web of sheet material 24 is fed to the other portions of the splicing apparatus. In order for the web of material 24 to be subjected to longitudinal tension, as it passes from the roll 22, braking means designated generally at 26 and 28 are provided at each end of the shaft 16. Each of said braking means may include a brake band 28, brake pressure plates 30, brake arm 32 and support bracket 34 as shown. Preferably such a brake is adjustable, whereby, the tension in the web 24 may be maintained at a preselected desirable amount.

The web 24 then passes partially around a tension or guide roll 38 having shaft-like projections 39 extending therefrom. The shaft-like projections are suitably mounted in journals 40 and 42, respectively, for which purpose antifriction bearings may, of course, be utilized if desired. The web 24 while being subjected to tension passes partially around a rear guide, shown as roller 44 for a purpose which will be more fully described hereinafter, and then is led partially around a forward guide, shown as roller 48. After leaving roller 48 the web is passed between resilient clamping rollers 46 and 47. The clamping rollers may be arcuately mounted for movement as shown in FIG. 2 in order to accommodate various web thicknesses, or they may be pivoted outwardly to an inoperative position.

Two pair of scissor levers 50, 52 and 50', 52', respectively, are disposed adjacent the longitudinal edges of the web, one pair being provided on each side thereof. It is to be noted at this point that the basic numerals designate the various components shown on the right-hand side of the apparatus as viewed in FIG. 1, whereas the same numerals with a prime thereafter designate the same corresponding components on the left-hand side of the apparatus. Rear rollers 44, 54 and forward rollers 48, 56 are each rotatably mounted on the corresponding ends of the levers or scissor arms 50, 50' and 52, 52', respectively, as shown in FIGS. 1 and 2. The levers 50, 50' and 52, 52', are each centrally pivotally mounted upon pinion shafts 58, 58', the ends of which are fixedly secured to the support members 10 and 12 at 60, 60'. The extremities of the clamping rollers 46 and 47 are each suitably journaled in the support members 10 and 12 respectively.

In FIGS. 2 and 3 there is shown the scissor levers 50, 52. FIG. 2 illustrates the open position and FIG. 3 illustrates the closed position of the scissors. Overtravel stops 59 are provided in order to prevent excessive outward movement of the levers 50 and 52. Spring members 62 and 64 are attached to the scissor arms 50 and 52 respectively. The opposite ends of said springs are mounted on pins 63 and 66, respectively, such pins being secured to the support member 10. Said springs normally urge the scissors 50, 52 to the closed position as shown in FIG. 3. The left-hand side of the apparatus is provided with similar resilient means (not shown) which operate in the same manner as described in connection with scissors 50', 52'.

As mentioned heretofore, web 24 passes in contact with the peripheral surfaces of rollers 44 and 48 and when under tension exerts a pressure thereon which counteracts the spring forces acting in the opposite direction and urges the scissors 50, 52 towards its open position. The apparatus will remain in this position until the tension in the web 24 is released as by means of the roll 22 becoming exhausted. Thus, when the roll 22 becomes exhausted the tension in the web 24 will be released and the scissors 50, 52 will move to its closed position as shown in FIG. 3.

Interposed between the forward rollers 48 and 56 is a reservoir 70 containing liquid adhesive material, and an adhesive roller 72 mounted on supporting members 10 and 12. The periphery of roller 72 extends into adhesive reservoir 70. Motive means such as electric motor 74 are connected to the adhesive roller 72 in order to impart rotary motion thereto. The peripheral surface of the adhesive roller 72 picks-up or becomes covered with adhesive material as it passes through the reservoir. When the scissors 50, 52 and 50', 52' move to their closed positions, the terminal portion of web 24 is relatively slack, and by reason of the then relative position of rollers 48, 56 and roller 72 passes in contact with the periphery of adhesive roller 72 and is pulled thereacross in such a manner that adhesive material is transferred to the trailing end of the web extending between rollers 48 and 44.

A second web of sheet material 76 is fed from a reserve mill or supply roll 78 which is mounted on shaft 80, the ends of which are rotatably mounted on the support members 10 and 12. The web 76 passes in proximity to the guide roller 82 which is mounted on shaft 84, shaft 84 being rotatably mounted on the support members 10 and 12. Web 76 then passes in proximity to rear roller 54 and thence to forward roller 56. This web passes over the rollers 54 and 56 and effects opening of said levers when it is running under tension during the opposite phase of the operational cycle. The terminal portion 86 of web 76 passes partially around the forward roller 56 and is held in position by holding means designated generally at 88 as will be described more fully hereinafter. Also, holding means 88' are provided on the opposed side of the device for use when web 24 is in reserve.

In operation a web of sheet material 24 is fed from the mill or supply roll 22, partially around guide roller 38, thence partially around rear roller 44, then passes by forward roller 48 and passes between clamping rollers 46 and 47 which may exert tension in the web, thence to guide roller 90 and on to a web treating machine designated generally at 92. Once tension is applied web contact with rollers 44 and 48 opens the scissors. Simultaneously, web 76 is held in position by holding means 88 after it has passed partially around forward roller 56. When the roll 22 becomes nearly exhausted the terminal portion of web 24 will become slack and the tension in said web will be released. Since the force developed by the spring member 62 is no longer counteracted by the web tension, the scissors 50, 52 and 50', 52' will move to their closed position as shown in FIG. 3. Rollers 48 and 56 will each follow an arcuate path towards each other and the peripheral surfaces thereof will engage one another pressing the web therebetween. It is to be noted at this point that the outer surface of the adhesive roller 72 is covered with adhesive material. The surface of web 24 will pass partially over the surface of the adhesive roller 72 and said adhesive will be transferred to the surface of the web. In response to this position of the scissors, clamping or holding means 88 releases the leading end of web 76 and the surface thereof is pressed between rollers 48 and 56. Thus, simultaneously the terminal portions of the web 24 and the web 76 will be pressed one against the other in overlapped superposed face-to-face relation. Since adhesive has been applied to one or both of the webs they will become permanently adhered as they pass between the press formed by the rollers 48 and 56. In order to insure that the adhesion is made permanent clamping rollers 46 and 47 may be employed to provide additional pressing, if desired. As soon as the two webs become permanently adhered tension builds up in web 76. By reason of the offset position of roll 78 and/or roller 82, web 76 urges the rear roller 54 and forward roller 56 outwardly counteracting the force of the springs 62 and 64, thus again opening the scissors. While the splicing apparatus is in operation, the operator may replace the exhausted roll 22 with a new supply roll and thread its end to holding means 88'. The aforementioned operational cycle will be substantially repeated except that web 76 will be running under tension while web 24 remains in its stand-by position.

It is to be pointed out that within the contemplation of my invention, the adhesive roller 72 and the adhesive reservoir 70 may be dispensed with when the terminal portion of at least one of the webs is provided with an adhesive strip which provides permanent adhesion between the terminal portions of said webs when subjected to compression force.

Figure 4:
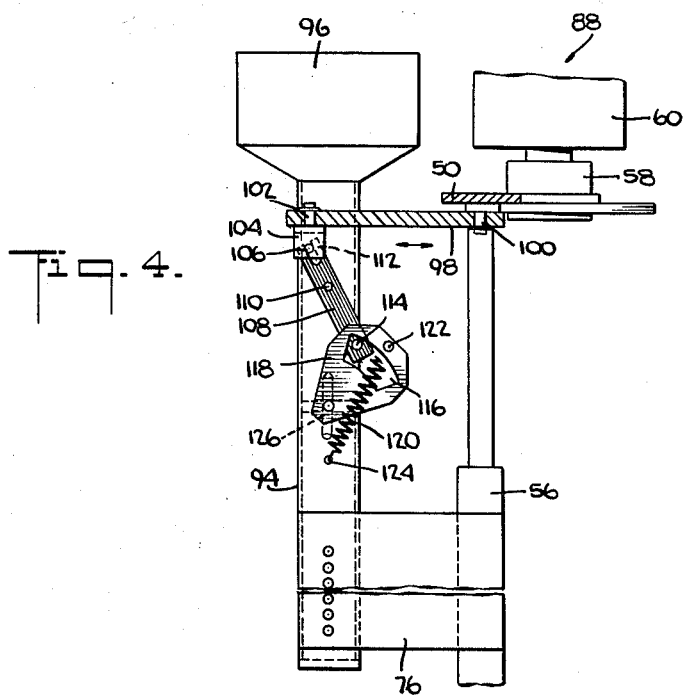
FIG. 4 is a detailed side elevational view showing one embodiment for holding the terminal portion of a newly supplied web.

Referring now to FIG. 4 in more detail, there is illustrated one embodiment for holding means 88. The terminal portion of web 76 is passed partially around forward roller 56 and over a perforated suction tube 94 to be secured thereto by means of a vacuum created in the interior of the tube from a blower or compressor 96 interconnected therewith. Connecting arm 98 is pivotally attached to the lever 50 as by means of pin 100, for example. The other end of the connecting arm 98 is attached by a means of pin 102 to bracket 104 which in turn contains a pin 106 projecting from the surface thereof. A connecting rod 108 is pivotally mounted on pin 110 which is disposed towards the center thereof. One end of the connecting rod 108 is provided with a bifurcated head 112 which is adapted to engage the pin 106. The other end of the connecting rod 108 is provided with a pin 114 which is adapted to reside in an arcuate slot 116 provided in the cover plate 118 for the purpose. Spring member 120 is interposed between pin 122 positioned in the cover plate 118 and pin 124 provided in the suction tube 94. Cover plate 118 is adapted to open the vacuum cap 126 and, thereby, release the vacuum contained in tube 94 to free the terminal end of the web 76 when the scissors are in their closed position.

Figure 5:
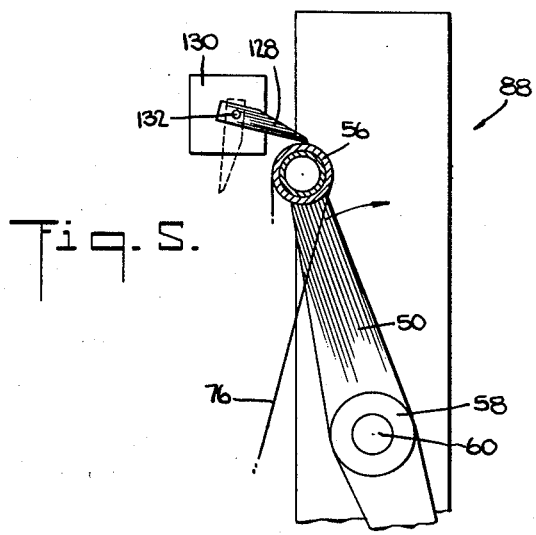
FIG. 5 is a detailed side elevational view showing a second embodiment of a means for holding the terminal portion of a newly supplied web.

Referring now to FIG. 5, there is illustrated another embodiment of the holding means 88. The web 76 extends partially around the forward roller 56 and is clamped thereagainst by means of holding finger 128 which is pivotally mounted upon support bracket 130 as by means of pin 132. The weight of the holding finger 128 is sufficient to secure the web 76 against the peripheral surface of the roller 56 while the scissors 50 and 52 are in their open position. When the lever 50 is swung towards its closed position as shown by the arrow in FIG. 5 the roller 56 will slip out of engagement with the holding finger 128 and thereby release the web 76. The holding finger then falls to a vertical position and remains there until the operator places the terminal portion of a new web thereunder in preparation for another cycle of operation.

Although certain particular embodiments of the invention are herein disclosed for purposes of explanation, various modifications thereof, after study of this specification will be apparent to those skilled in the art to which the invention pertains, reference should accordingly be had to the appended claims in determining the scope of the invention.

What is claimed and desired to be secured by Letters Patent is:

1. A splicing device for joining two webs of sheet material wherein one of said webs is normally running under tension comprising, a pair of guide members each adapted for engagement by one of the webs and for movement in response to tension in the web engaging it, a pair of pressing members for pressing said webs one against the other upon relaxation of said web tension, said pressing members each being adapted for engagement by one of said webs when under tension and movement thereby, linkage means interposed between said guide members and said pressing members, and each connecting one of said guide members to one of said pressing members and means urging said pressing members to pressing position upon relaxation of said web tension.

2. A splicing device for joining two webs of sheet material wherein one of said webs is normally running under tension comprising, a pair of pivotally mounted guide members adapted for engagement by one of the webs and for movement in response to such tension when one of said webs passes thereover, a pair of pivotally mounted pressing members for pressing said webs one against the other upon relaxation of said web tension, linkage means interconnecting each of said guide members with one of said pressing members for positioning said pressing members in response to the movement of said guide members, and means urging said pressing members to pressing position upon relaxation of said web tension.

3. A splicing device for joining two webs of sheet material wherein one of said webs is normally running under tension comprising a first guide for one web, a second guide for the other web, a first pressing member for the first said web, a second pressing member for the second said web, first linkage means interconnecting said first guide with said second pressing member, second linkage means interconnecting said second guide with said first pressing member, each of said guides adapted for movement in response to said tension when its respective web passes thereover, each of said pressing members being positioned in response to the movement of its respective guide, and means urging said pressing rollers towards one another upon relaxation of the tension in the running web.

4. A splicing device for joining a first and a second web of sheet material wherein one of said webs is normally running under tension comprising a first guide for said first web and a spaced apart second guide for the second web, a first rear roller for said first web and a second rear roller for the second web, said rear rollers being disposed inwardly from said guides respectively, a first pressing roller for said first web and a second pressing roller for said second web, said pressing rollers normally coacting to press said webs one against the other, first linkage means interposed between said first rear roller and said second pressing roller, second linkage means interposed between said second rear roller and said first pressing roller, said second pressing roller adapted for outward movement when said first web passes over said first rear roller and said first pressing roller adapted for outward movement when said first web passes thereover, said first pressing roller adapted for outward movement when said second web passes over said second rear roller and said second pressing roller adapted for outward movement when said second web passes thereover, and means urging said pressing members to pressing position upon relaxation of said web tension.

5. The splicing device of claim 4 wherein the axes of said guides and rear rollers and pressing rollers are all disposed in parallel relationship to each other.

6. A splicing device for joining a first and a second web of sheet material wherein one of said webs is normally running under tension comprising two pair of scissor levers, a pair of rear guides and a pair of forward rollers mounted on the corresponding ends of said levers respectively, one of said rear rollers being adapted to open said levers when said first web passes thereover, the other rear roller being responsive to said second web for opening said levers when said second web is running under tension, means for applying adhesive to a portion of one of said webs, means urging said forward rollers towards one another upon relaxation of the tension in the running web whereby said two forward rollers coact to press said webs one against the other.

7. A splicing device for joining a first and a second web of sheet material wherein one of said webs is normally running under tension comprising two pair of scissor levers, a pair of rear rollers and a pair of forward rollers mounted on the corresponding ends of said levers respectively, one of said rear rollers being adapted to open said levers when said first web passes thereover, the other rear roller being responsive to said second web for opening said levers when said second web is running under tension, means for holding the terminal portion of said second web when said first web is running under tension and releasing such hold when such tension is released, and means urging said forward rollers towards one another upon relaxation of the tension in the running web whereby said two forward rollers coact to press said webs one against the other.

8. A splicing device for joining a first and a second web of sheet material wherein one of said webs is normally running under tension comprising two pair of normally closed scissor levers disposed in spaced apart relationship one to the other, said two levers of each pair being centrally pivotally connected one to the other, each of said levers having a forward end and a rear end, two rear rollers and two forward rollers mounted on the corresponding ends of said levers respectively, one of said rear rollers and one of said forward rollers being adapted for movement to open said levers when said first web passes thereover, the other rear roller and the other forward roller being adapted for movement to open said levers when said first web passes thereover, means for applying adhesive to one of said webs, and means urging said forward rollers towards one another upon relaxation of the tension in the running web whereby said two forward rollers coact to press the terminal portions of said webs one against the other.

9. The web splicing device in accordance with claim 8 wherein a plurality of clamping rollers are provided for pressing the terminal portions of said webs one against the other after said webs have passed said forward rollers.

10. The web splicing device in accordance with claim 8 wherein two tension guide rollers are provided each of which is disposed outwardly from said rear rollers respectively.

11. In a web splicing device having a first web running under tension from a first roll and a second web adapted to run under tension from a second roll, the combination comprising two pair of scissor levers disposed adjacent the longitudinal edges of said running web, said two levers of each pair being centrally pivotally connected one to the other, each of said levers having a forward end and a rear end, means urging said levers to closed position, two rear rollers and two forward rollers mounted on the corresponding ends of said levers respectively, the axes of said rollers extending perpendicularly to said running web, said levers being adapted for opening movement in response to said tension in the running web and notwithstanding the force of said urging means, means for applying adhesive to the terminal portion of one of said webs, and said two forward rollers coacting under the influence of said urging means to press the terminal portions of said webs one against the other when the tension in said running web is released and said levers are closed.

12. In a web splicing device having a first web running under tension from a first roll and a second web adapted to run under tension from a second roll, the combination comprising, means for applying adhesive to the terminal portion of one of said webs, a pair of scissor levers, means mounted on said levers and engaging the running web whereby the scissor levers are maintained in open position by the tension in the running web, means urging the scissor levers to closed position, means for holding the terminal portion of the second web while the first web is running and releasing such hold when the tension in the first web is relaxed, and means adapted to press the terminal portion of the webs against one another in response to such relaxation and under the influence of said lever urging means.

13. The splicing device in accordance with claim 12 wherein said means for holding the terminal portion of said second web comprises a pivotally mounted holding finger adapted to clamp the terminal portion of said second web against the periphery of one of said means mounted on the levers when said levers are open.

14. The web splicing device according to claim 12 wherein said means for applying adhesive comprises an adhesive roller disposed adjacent said means adapted to press the terminal portions of the webs together, means for rotating said adhesive roller, a reservoir of adhesive material, the periphery of said adhesive roller being adapted to pass through said reservoir and transmit adhesive to one of the webs as it passes thereover.

References Cited by the Examiner

UNITED STATES PATENTS

| | | | |
|---|---|---|---|
| 1,623,277 | 4/27 | Scott | 242—58.4 |
| 1,693,436 | 11/28 | Drange | 242—58.4 |
| 2,379,495 | 7/45 | Roesen | 242—58.5 |
| 2,613,042 | 10/52 | Dice | 242—56 |
| 3,075,718 | 1/63 | Butler | 242—58.4 |

MERVIN STEIN, *Primary Examiner.*